United States Patent
Grant, Sr.

(10) Patent No.: US 7,876,065 B2
(45) Date of Patent: Jan. 25, 2011

(54) METHOD FOR EXTENDING THE TIME A PORTABLE GENERATOR POWERED BY A DC BATTERY MAY OPERATE BY RECHARGING THE BATTERY AT THE SAME TIME IT IS BEING USED AS A POWER SOURCE

(75) Inventor: Earl Grant, Sr., 6723 S. Oglesby, Chcago, IL (US) 60649

(73) Assignee: Earl Grant, Sr., Chgo, IL (US)

( * ) Notice: Subject to any disclaimer, the term of this patent is extended or adjusted under 35 U.S.C. 154(b) by 113 days.

(21) Appl. No.: 12/384,284

(22) Filed: Apr. 2, 2009

(65) Prior Publication Data

US 2009/0251098 A1   Oct. 8, 2009

Related U.S. Application Data

(63) Continuation-in-part of application No. 11/066,080, filed on Feb. 25, 2005, now abandoned.

(60) Provisional application No. 60/550,957, filed on Mar. 4, 2004.

(51) Int. Cl.
*H01M 10/44* (2006.01)

(52) U.S. Cl. ...................................................... 320/101

(58) Field of Classification Search ................. 320/101, 320/103, 107, 114, 115, 127, 128, 132, 135, 320/138, 140; 322/1, 2 R; 290/50, 53, 54, 290/1 R
See application file for complete search history.

(56) References Cited

U.S. PATENT DOCUMENTS

| | | | | |
|---|---|---|---|---|
| 1,275,201 A | * | 8/1918 | Beach | 290/10 |
| 2,813,984 A | * | 11/1957 | Dolecki et al. | 290/10 |
| 3,719,881 A | * | 3/1973 | Shibata et al. | 322/11 |
| 4,042,056 A | * | 8/1977 | Horwinski | 180/65.25 |
| RE31,156 E | * | 2/1983 | Dessert | 180/2.2 |
| 4,438,342 A | * | 3/1984 | Kenyon | 290/45 |
| 4,470,476 A | * | 9/1984 | Hunt | 180/65.25 |
| 4,604,565 A | * | 8/1986 | Yokota et al. | 320/123 |
| 4,951,769 A | * | 8/1990 | Kawamura | 180/65.245 |
| 5,497,070 A | * | 3/1996 | Furutani et al. | 322/23 |
| 5,689,174 A | * | 11/1997 | Pacheco, Sr. | 322/16 |
| 2007/0227470 A1 | * | 10/2007 | Cole et al. | 290/1 A |

* cited by examiner

*Primary Examiner*—Edward Tso

(57) ABSTRACT

A method for extending the time a battery-operated electrical generator may operate by recharging the battery, at the same time it is being used as a power source, by using a portion of the electrical output to operate an alternator to produce low current and low voltage electrical power to recharge the battery, while supplementing from another source, including solar or wind, the power used to operate the alternator.

1 Claim, 1 Drawing Sheet

METHOD FOR EXTENDING THE TIME A PORTABLE GENERATOR POWERED BY A DC BATTERY MAY OPERATE BY RECHARGING THE BATTERY AT THE SAME TIME IT IS BEING USED AS A POWER SOURCE

CROSS-REFERENCE TO RELATED APPLICATIONS

Provisional Application No. 60/550,957 filed Mar. 4, 2004. This is a continuation-in-part of application Ser. No. 11/066,080 filed Feb. 25, 2005, now abandoned.

STATEMENT REGARDING FEDERALLY SPONSORED RESEARCH OR DEVELOPMENT

Not applicable

REFERENCE TO SEQUENCE LISTING, A TABLE, OR A COMPUTER DISK APPENDIX

Not Applicable

BACKGROUND OF THE INVENTION

There are many situations in which users of electrical tools, lights, radios, appliances, equipment and other electrically-powered items are unable to connect to a regular source of electrical power. In such situations, the equipment may be connected to a portable generator powered by gasoline or a DC battery. However, neither is entirely satisfactory as a power source because gasoline powered generators are expensive to operate due to the continual need to refuel, and a DC battery powered generator must be frequently recharged.

Relevant U.S. Patents are identified below:

| | | |
|---|---|---|
| 5,689,174 | November, 1997 | Pacheco |
| Re31156 | February, 1983 | Dessert |
| 1,275,201 | August, 1918 | Beach |
| 2,813,984 | November, 1957 | Dolecki, et al. |
| 3,719,881 | March, 1973 | Shibata, et al. |
| 4,042,056 | August, 1997 | Horwinski |
| 4,438,342 | March, 1984 | Kenyon |
| 4,470,476 | September, 1984 | Hunt |
| 4,604,565 | August, 1986 | Yokopta, et al. |
| 4,951,769 | August, 1990 | Kawamura |
| 5,497,070 | March, 1996 | Furutani, et al. |

BRIEF SUMMARY OF THE INVENTION

The invention addresses the need to recharge a DC battery by using a portion of the electrical output, at the same time the battery is being used as a power source, to produce low level alternating current to recharge the battery. The invention is an advance over exiting portable generator technology because:

1. The time the DC powered generator may be operated without recharging is increased.

2. The user will save money over the use of a gasoline powered generator.

3. Due to its ability to provide extended battery life, the portable generator can be used at places where house current is not available.

4. Camping vans can be connected to the portable generator to power electrical devices.

DETAILED DESCRIPTION OF THE INVENTION

Figure 1:
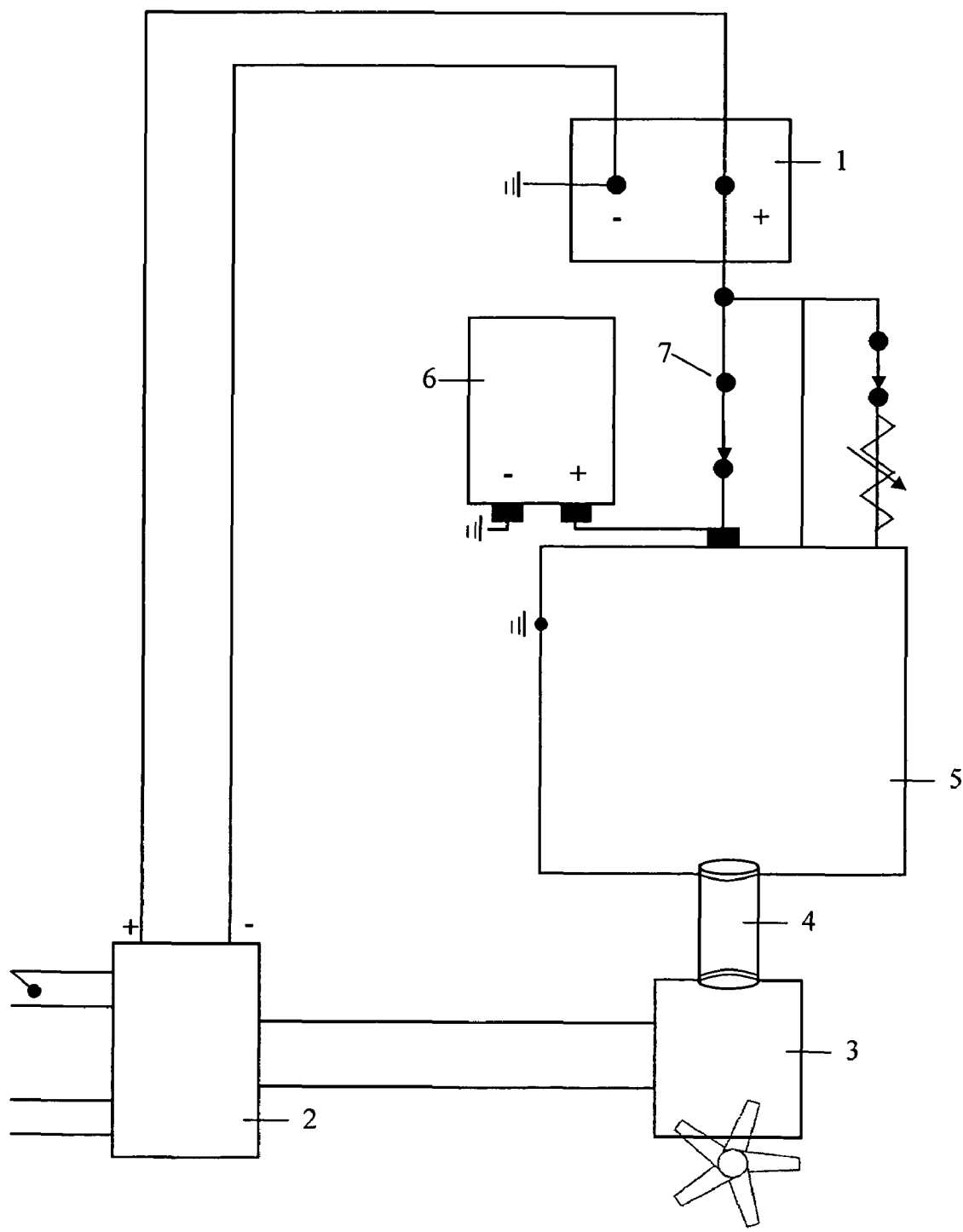
FIG. 1 System diagram showing DC battery, inverter, AC motor and fan, mechanical shaft, alternator and regulator, and return to DC battery, with additional power source external to the system.

A DC battery (1), the input source, is connected to an inverter (2). The inverter is connected to a motor and fan (3). The motor is connected by means of a mechanical shaft (4) linked together with non-metallic material to an alternator and regulator (5) that feeds power back in to the positive terminal of the battery. The system load, such as a power tool, connects to the system between the electrical output of the inverter and ground.

When the system is activated, the inverter converts DC power from the battery to supply AC power to the load and, at the same time, to the mechanical motor causing it to turn. The torque from the motor is transferred to the alternator by way of the shaft, causing the alternator to turn and generate low current and wattage electrical power which feeds back to recharge the battery.

In order to compensate for the power drained from the system to operate the mechanical motor, additional electrical power is provided by a source external to the system (6) such as a solar or wind-generated power system. A test point switch (7) is included on the line between the DC battery and the alternator and generator to allow the operator to test current and voltage levels and to open and close line for charge monitoring.

All grounds are common.

Aside from the system assembly shown in FIG. 1, all of the components and mechanical apparatus are available commercially. The method of connecting and employing these components is new.

PARTS LIST BY NUMBER FOR FIG. 1

1. DC battery
2. Inverter
3. Motor and fan
4. Mechanical shaft
5. Alternator and regulator
6. Additional power source
7. Test point

What I claim as my invention is:

1. A method for extending the time a DC battery operated portable generator may operate by recharging the battery, at the same time it is being used as a power source, by converting its output to AC power first to handle the system load and next to operate an alternator system to produce low current and low voltage DC power, and to use the DC power for that purpose by connecting the alternator to the DC battery, while supplementing from another source, including solar or wind, the power used to operate the alternator.

* * * * *